INVENTORS.
ROBERT W. RASMUSSEN
DAVID H. JOHNS
BY
ATTORNEYS

July 7, 1970  R. W. RASMUSSEN ET AL  3,519,727
SAFETY RELEASE MECHANISM FOR OVERHEAD POWERLINES
Filed Nov. 26, 1968  3 Sheets-Sheet 2

INVENTORS.
ROBERT W. RASMUSSEN
DAVID H. JOHNS
BY
Lyon & Lyon

July 7, 1970 R. W. RASMUSSEN ET AL 3,519,727
SAFETY RELEASE MECHANISM FOR OVERHEAD POWERLINES
Filed Nov. 26, 1968 3 Sheets-Sheet 3
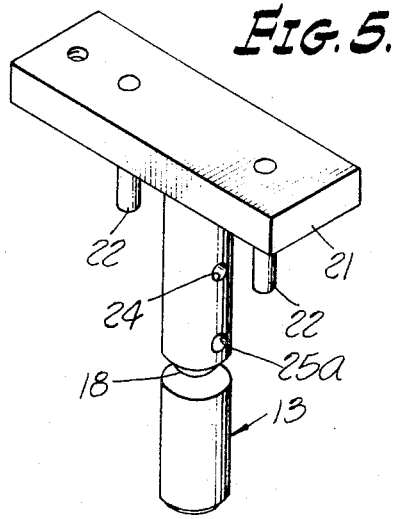
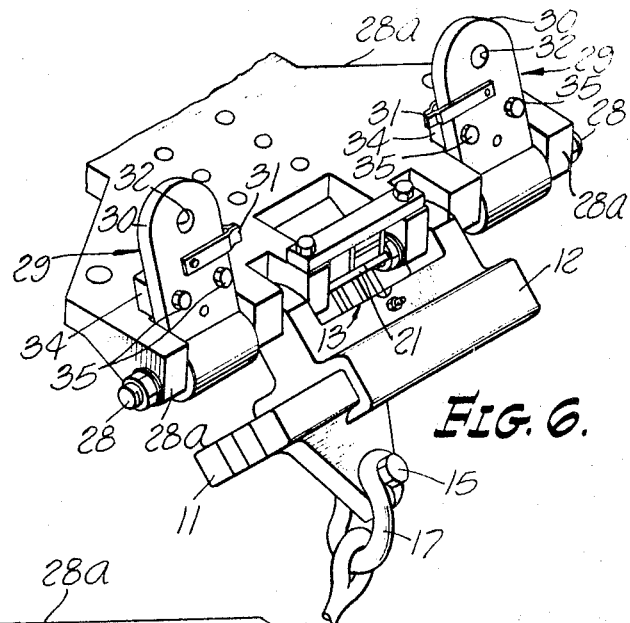
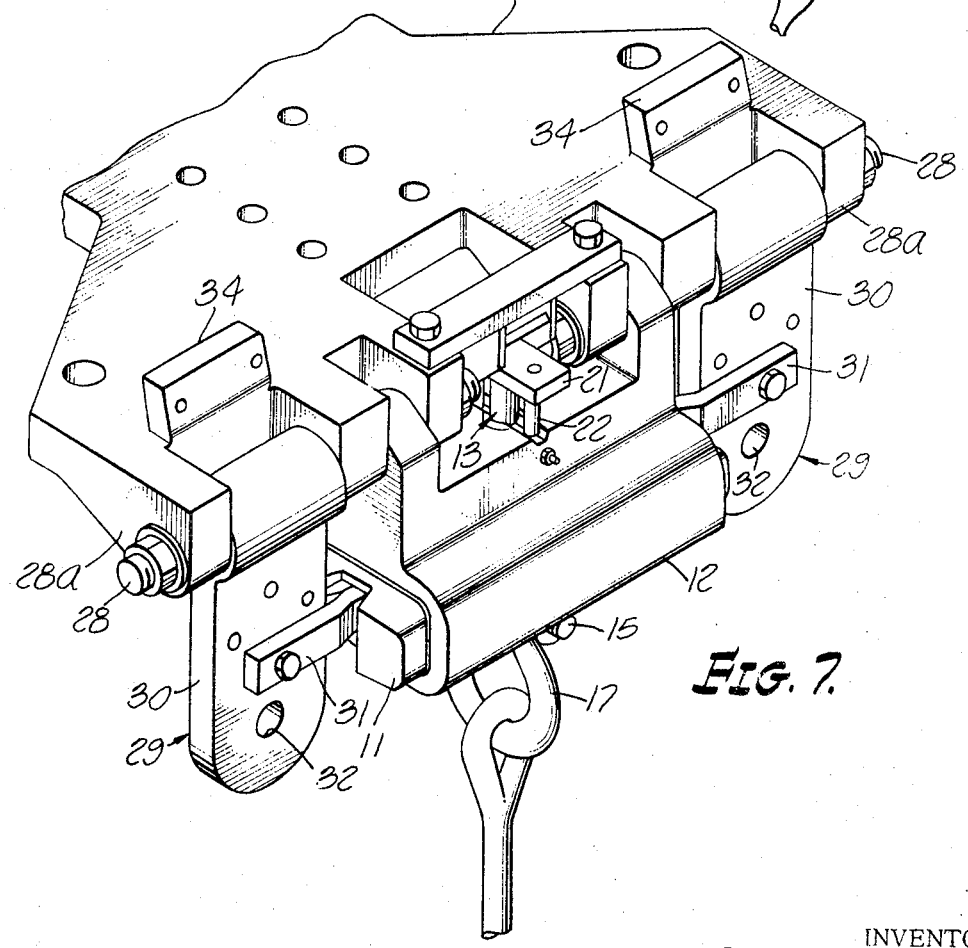
INVENTORS.
ROBERT W. RASMUSSEN
DAVID H. JOHNS
BY
*Lyon & Lyon*
ATTORNEYS

United States Patent Office 3,519,727
Patented July 7, 1970

1

3,519,727
SAFETY RELEASE MECHANISM FOR OVERHEAD POWERLINES
Robert William Rasmussen, Simi, and David H. Johns, Montrose, Calif., assignors to Southern California Edison Company, Los Angeles, Calif., a corporation of California
Filed Nov. 26, 1968, Ser. No. 779,092
Int. Cl. H02g 7/18
U.S. Cl. 174—45    10 Claims

ABSTRACT OF THE DISCLOSURE

This invention relates to a release mechanism for overhead powerlines which will support the lines under normal conditions but which will release the lines under abnormal longitudinal loads which would cause damage to the suspension towers. The device comprises a slide and a slide support, the slide support being pivotally attached to the transmission tower and the slide being pivotally attached to a transmission line, said slide held against vertical and transverse forces by said support and against longitudinal forces by a shear pin connecting the slide to the slide support so that when excessive longitudinal forces occur, said pin will break and the slide will become disengaged from the slide support thereby disengaging the transmission line from the tower.

BACKGROUND OF THE INVENTION

It is of great importance that electric power transmission systems be designed and maintained so that mechanical breakdown and resulting power failure are avoided. Such power failures cause loss and inconvenience to the private sector of the country and may also represent a serious weakness to the national defense. The reliability of the power transmission lines is essential to the overall power transmission system.

Power transmission lines or cables are normally supported from horizontally extending cross arms on upright towers. The transmission lines comprise metal cables which are of considerable weight. Generally, the load of these cables is the result of several force components. There is a vertical component caused by the weight of the cables and possible snow or ice on the cables, a transverse component which may be caused by forces such as wind on the cables and a longitudinal component of the force which produces torsion and bending of the towers.

Normally, the longitudinal forces acting on the cross arm of a tower are essentially equal in both directions thus tending to balance each other and avoiding loads which would cause bending of the tower cross arms. However, this equilibrium is destroyed when a cable breaks in one of its sections. Then the section which is broken ceases to exert a longitudinal force on the cross arm to which it is attached. That cross arm is then subjected to a longitudinal force in one direction only. Since it is not practical to design all suspension towers to withstand these loads due to broken cables, damage may result to the cross arm carrying the broken cable or to the entire tower with the resultant breaking of other cables carried by the tower. In inaccessible areas, the problem is especially severe since a long period of time may be required for the arrival of repair crews. Thus, it is essential to provide a means for protecting the towers and their cross arms against longitudinal loads resulting from broken conductors.

This problem of unbalanced longitudinal forces on the cross arms of transmission line towers has long been recognized. In U.S. Pat. 1,939,964, a device is described

2 which provides for disengagement of the power line from the tower cross arm when the longitudinal forces become unbalanced. Attachment of the cable to the tower is accomplished by means of a hook, connected to the cable, which hangs from a track on the tower. Disengagement results when there is a shift in the position of a transmission line due to an unbalanced longitudinal force thus causing the hook to become dislodged from the track and dropping the line from the cross arm.

Another structure for disengaging the transmission line in the case of an excessive longitudinal force is described in U.S. Pat. No. 3,150,229. In that device, an excessive longitudinal movement of the transmission line also causes movement and resulting disengagement of the suspending device.

Both of the devices described above disengage the cables as the result of movement of the cables. Although such movement is normally the result of an excessive unbalanced longitudinal force on the cables, movement of the cables which causes their release may occur when the longitudinal force would not cause damage to the tower and such disengagement is of course undesirable. Thus, a suspension device which is directly responsive to the amount of unbalanced longitudinal force exerted on a tower cross arm is desired. An effective locking device to prevent disengagement during maintenance, etc., is also desired.

SUMMARY

Briefly, the present invention provides a device for attaching a power transmission cable to a power transmission tower cross arm so that the cable will not become disengaged from the cross arm on the application of high transverse or vertical forces but will become disengaged from the cross arm when the unbalanced longitudinal force approaches that which would cause damage to the cross arm.

It is, therefore, an object of the present invention to provide a suspension device which will disconnect a transmission cable from a tower cross arm in response to a dangerously high unbalanced longitudinal force exerted on the cable.

It is a further object of this invention to provide a suspension device which provides for an unrestricted transmission of force from the cable to the cross arm.

It is a further object of the present invention to provide a transmission cable suspension device which can be locked so that the cable will not become disengaged from the cross arm.

These and other objects will become apparent by further references to the specification and drawings.

BRIEF DESCRIPTION OF THE DRAWINGS

FIG. 5 is a perspective view of the shear pin;

FIG. 6 is a fractional perspective view of the suspension device illustrating its position during breakaway of the cable from the cross arm of the tower; and FIG. 7 is a fractional perspective view illustrating a method of locking the suspension device so that breakaway of the cable from the cross arm is prevented.

DESCRIPTION OF THE PREFERRED EMBODIMENTS

Figure 1:
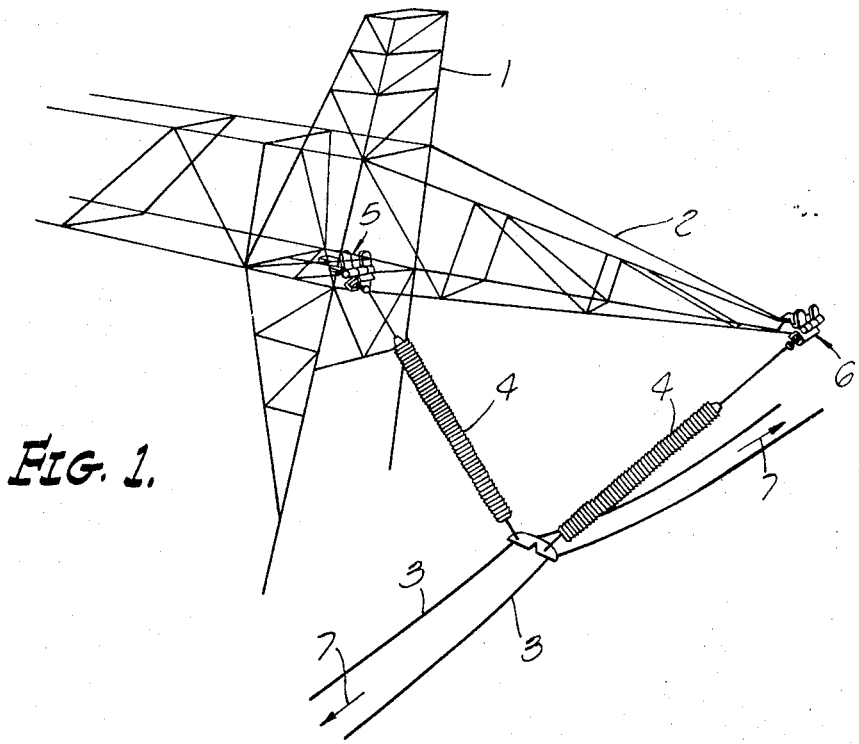
FIG. 1 is a fractional perspective view illustrating the suspension of a transmission cable from the cross arm of a transmission tower using the suspension means of the present invention.

The present invention can be most readily understood by considering the drawings in detail. FIG. 1 illustrates a section of a power transmission tower having a vertical tower 1 and a horizontal cross arm 2. Typically, such a tower has two vertical sections corresponding to section 1 and a cross arm such as 2 extending on both sides. A three phase conductor might have a phase suspended at the extremity of each cross arm and the third phase suspended from the center of the cross arm. Power transmission lines 3 are suspended from the cross arm by V-type suspension insulator string 4 and breakaway devices which cause disengagement of the transmission cable from the cross arm when either of the longitudinal forces, illustrated here by arrows 7, become excessively large.

Figure 2:
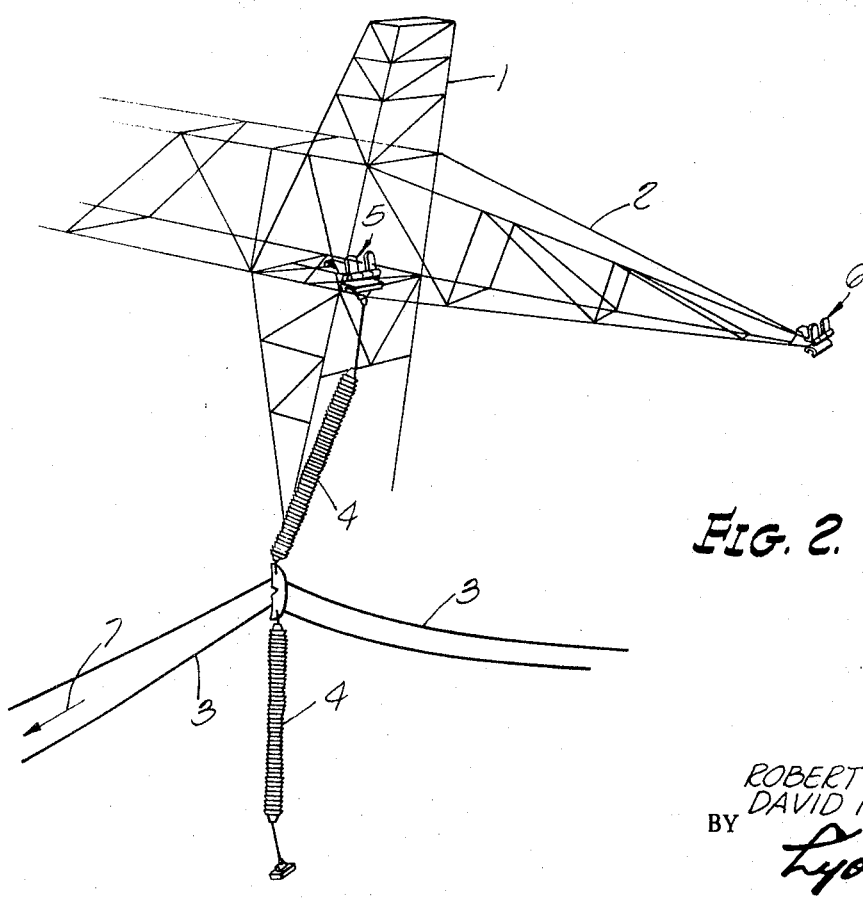
FIG. 2 is a fractional perspective view illustrating the position of a transmission cable with respect to a transmission tower when the suspension device of the present invention has disengaged the cable from the cross arm.

FIG. 2 illustrates a transmission tower and cable which was originally attached to the cross arm by means of suspension devices 5 and 6. However, the unbalanced longitudinal force 7 became so great that it caused disengagement of the cable from the cross arm at suspension device 6. As a result, the transmission cable is attached to the tower only at the vertical section 1. The vertical section of the tower is normally able to withstand greater longitudinal forces than the cross arm portion. However, suspension device 5 will provide for disengagement of the cable 3 from the tower if the longiutdinal force 7 should become so great as to threaten damage as a result of the attachment of cable 3 to the vertical section of the tower.

Figure 3:
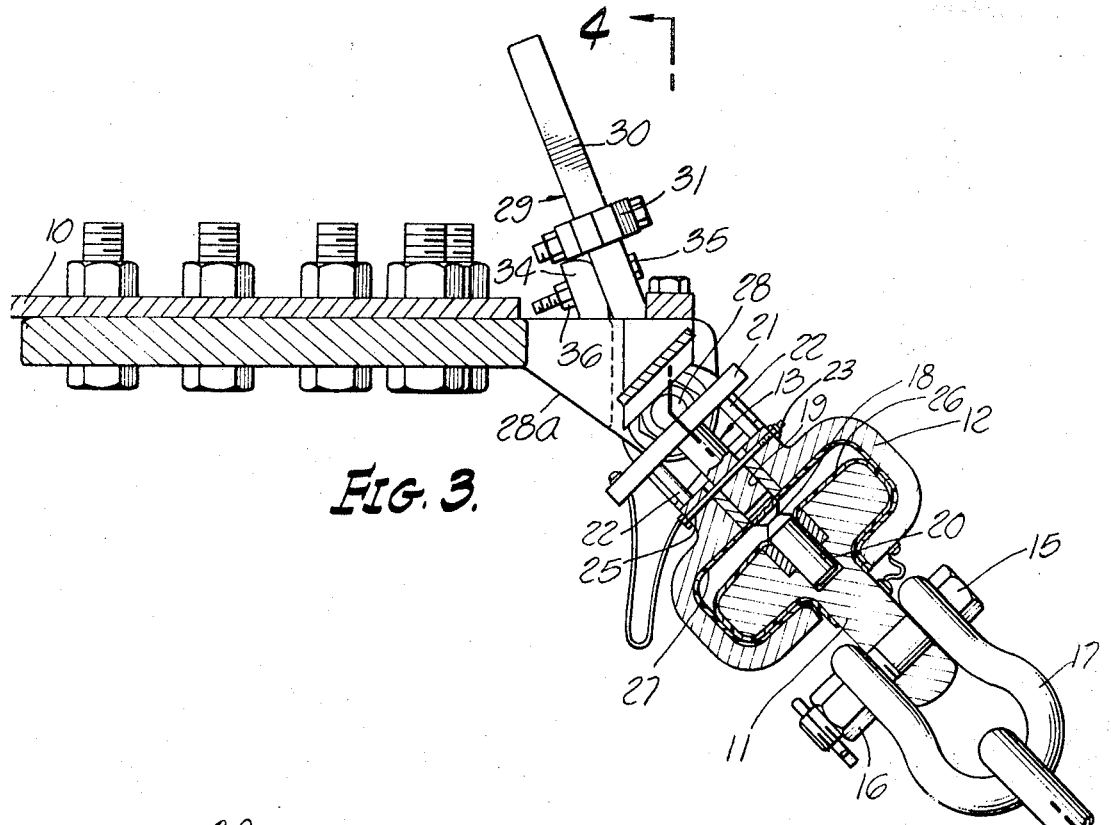
FIG. 3 is a view of the suspension device, partly in section, looking at the device in the longitudinal direction along the cable which is supported.

The suspension device is illustrated in FIG. 3. The outer section of the tower cross arm is illustrated by beam 10. The suspension device comprises slide 11, slide support 12 and shear pin or frangible pin 13. The slide support is pivotally connected to the cross arm while the slide is connected to the transmission cable by pivotal means shown here as bolt 15, nut 16 and U-shaped attaching means 17. Such a pivotal arrangement provides for freedom of movement between the transmission lines and the tower cross arms.

Vertical and transverse forces from the cable are transmitted to slide 11 and from slide 11 to slide support 12 against which the slide bears. From the slide support, these forces are transferred to the cross arm 10. Longitudinal forces, which would be perpendicular to the plane of the paper in FIG. 3, are transferred from slide 11 first to frangible pin 13 and then to slide support 12 and cross arm 10.

Frangible pin 13 is designed so that it will fail when the longitudinal load approaches that load which will cause damage to the cross arm of the tower. Although a pin having a uniform circular cross section is shown, any type of cross section may be employed for the pin. The pin may be notched as indicated at 18 in order to provide for proper shearing of the pin at the desired load. The pin 13 fits axially into a cylindrical bore 19 in the slide support 12. The lower portion of the pin 13 extends beyond the bore 19 and is seated in the hole 20 in the slide 11. Normally the notch 18 is located between the slide 11 and slide support 12, however, the pin may be prevented from completely seating itself in hole 20, so that the pin is engaged with both the slide and slide support but notch 18 is within bore 19. In this position, the device will withstand greater loads since the strength of the pin is equal to its full diameter rather than notched diameter strength. A cap 21 at the upper end of the pin 13 includes a pair of guide rods 22 which slide into openings in the slide support to rotatably position the pin 13 in the bore 19 and align openings 24 and 25 in the pin 13 and slide support 12, respectively. A lock pin 23 passes through the aligned openings 24 and 25 to prevent axial movement of the pin 13 in the bore due to vibration of the device. The axial movement of the pin 13 could cause premature actuation of the release mechanism. An additional opening 25a in pin 13 is provided to allow the lock pin 23 to pass through and hold pin 13 when the notch 18 is within bore 19.

In order that the slide will move smoothly in the slide support when the pin is broken, the surfaces of the slide and slide support may be covered by a material which will reduce friction and/or prevent corrosion. The slide is shown with a Teflon (polytetrafluoroethylene) coating 26 and the slide support with a Teflon coating 27. Teflon coatings 26 and 27 normally include a first layer of glass impregnated Teflon for strength and a second layer of pure Teflon about $\frac{1}{32}''$ thick to prevent ice from collecting on these surfaces which might interfere with the operation of the device.

Figure 4:
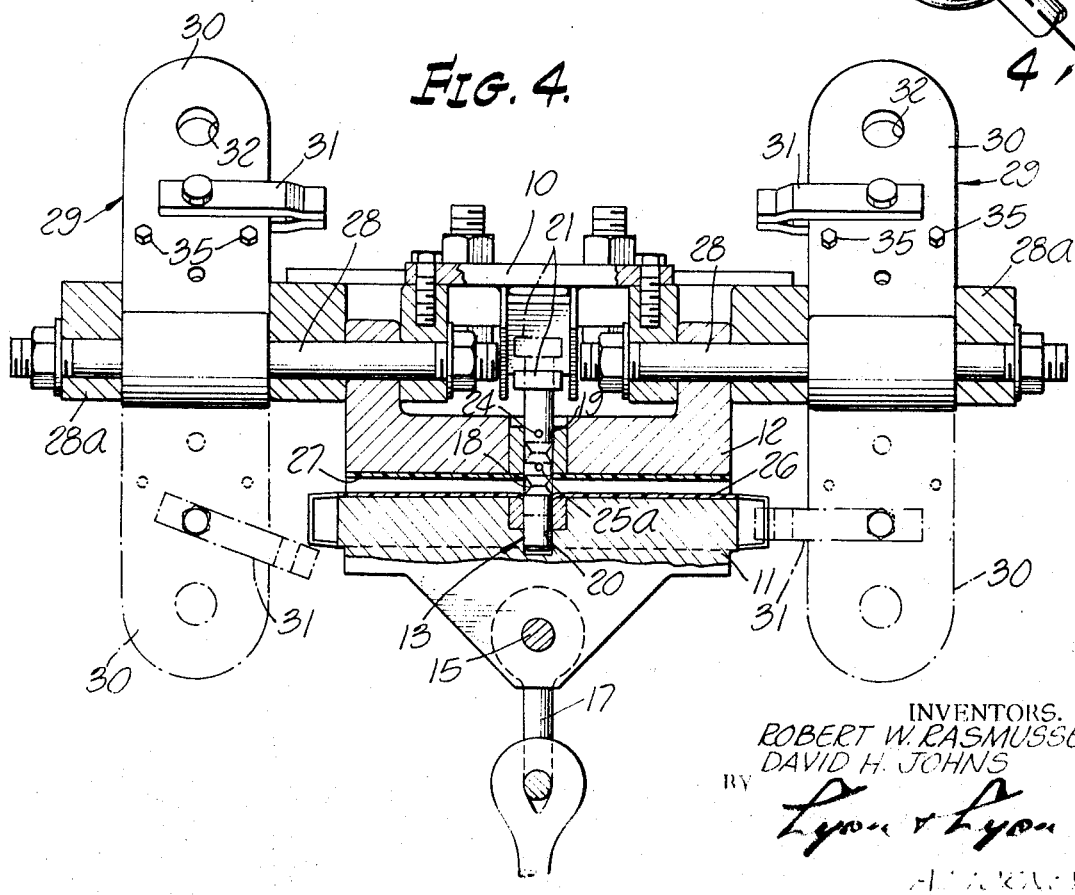
FIG. 4 is a side sectional view taken along line 4—4 of FIG. 3.

FIG. 4 is a sectional view along line 4—4 illustrating the support device shown in FIG. 3. This figure illustrates the means by which the slide support is pivotally connected to the cross arm by means of rods 28, and a hinge plate 28a.

FIG. 6 illustrates the suspension device in operation when the longitudinal load has become so large that the frangible pin is broken. In this case, slide 11 is pulled out of support 12 thus disengaging the cable from the cross arm.

FIG. 7 illustrates the retaining means 29 in an operative position. Retaining means 29 are provided to prevent the slide from becoming disengaged from the slide support. This slide retaining feature may be employed when the pin is changed or removed for inspection or for any other reason it is desired to do away with the safety feature provided by the suspension device. The retaining means 29 includes a pair of brackets 30, with one bracket pivotally mounted to one rod 28 adjacent to one end of the slide support and the other bracket pivotally mounted to the other rod 28 adjacent to the other end of the slide support. As shown in FIG. 6, when the retaining means are not in use they are connected in an upwardly extending inoperative position to a flange member 34 by bolts 35 and nuts 36. A change out tool 31 is pivotally connected to each bracket. Each bracket 30 can be lowered from the normal upwardly extending position into an operative position opposite an end of the slide 11 with the change out tool 31 on each bracket pivoted upward to engage the end of the slide 11 and thereby restrain the slide 11 from longitudinal movement in either direction when the pin 13 is removed or broken. Each bracket is also provided with an opening 32 adapted to receive bolt 15, nut 16 and the U-shaped attaching means 17 or any similar such pivotal support to support the cable 3 when the suspension device is inoperative or otherwise not in use.

In operation, when the unsafe longitudinal load occurs, the pin will break and the slide will be pulled out of the slide support thus disengaging the cable from the cross arm. If a V-shaped suspension illustrated in FIG. 1 is used, the cable will then be supported from the vertical tower section as shown in FIG. 2. The cable may also be attached to the vertical tower section by means of the suspension device of the present invention. Since the vertical tower can withstand a greater longitudinal force than the cross arm, the suspension device 5 will have a stronger pin so that it withstands a greater force than that which caused suspension device 6 to break away from the tower. However, should the force represented by 7 become so great as to present a danger to the vertical tower, the pin in suspension device 5 will shear thus dropping lines 3 to the ground and removing the load on the tower.

The suspension device of the present invention may be fabricated from any desired material. For example, the device may be cast ductile iron with steel used for the pins and rods. Preferably, the shear pin should be fabricated from stainless steel or some other corrosion resistant material so that its strength will remain constant. Of course, it can be seen that it is important to maintain the bearing surfaces in a condition so that the slide will be readily removed from the slide support once the shear pin has failed. This can be provided for by use of various lubricating materials. In a preferred embodiment, the bearing surfaces are coated with a material which will facilitate movement of the slide. A preferred coating is a polymeric material such as polytetrafluoroethylene (Teflon). The coating may comprise a lower layer of Teflon which is glass impregnated for strength and an upper layer of pure Teflon, approximately 1/32" thick, to prevent icing.

The foregoing description and drawings are intended merely as illustrative of the present invention and should in no way be considered as limiting the scope of the invention. Thus, the general shape of the slide and slide support may be varied greatly while remaining within the scope of the present invention. For example, the slide may be generally cylindrical in shape rather than slab shaped. Furthermore, any suitable means of attaching the slide and slide support to the transmission line and tower cross arm, respectively, may be used.

We claim:

1. A breakaway suspension device for supporting a cable on a transmission tower comprising; slide means adapted for attachment to a cable, a slide support means for restraining the slide against movement in the transverse and vertical direction and adapted for connection to the transmission tower, pin means connecting said slide means to said slide support so that an unbalanced longitudinal force on said cable will be transmitted to the pin through the slide, the pin means having a strength so that it will shear before an undesirable large longitudinal force is applied to the tower, said slide means adapted to slide on said slide support after said pin means is sheared and the surfaces of the slide and slide support which bear against each other being coated with polytetrafluoroethylene.

2. A system for leasing a cable from a supporting tower comprising a vertical tower with a horizontal cross arm, a first suspension device of claim 1 attached to the end of the cross arm, a second suspension device of claim 1 attached to the cross arm near the vertical tower, a first insulator string attached at one end to the slide of said first suspension device and adapted at its other end for attachment to a cable, a second insulator string attached at one end to the slide of said second suspension device and adapted at its other end for attachment to a cable near the point of attachment of said first string, and said second device having a stronger pin than said first device.

3. A breakaway suspension device for supporting a cable on a transmission tower comprising: slide means adapted for attachment to a cable, a slide support means for restraining the slide against movement in the transverse and vertical direction and adapted for connection to the transmission tower, pin means connecting said slide means to said slide support so that an unbalanced longitudinal force on said cable will be transmitted to the pin through the slide, the pin means having a strength so that it will shear before an undesirable large longitudinal force is applied to the tower, and the slide support having means to restrain longitudinal movement of the slide in the support and prevent disengagement of the slide from the support, when said pin is removed, said restraining means being pivotable to an inoperative position when said pin is in place.

4. The device of claim 3 wherein said restraining means includes first and second brackets, said first bracket pivotally connected to a transmission tower adjacent one end of said slide support, said second bracket pivotally connected to the transmission tower adjacent the other end of said slide support, said first bracket movable into the path of longitudinal movement opposite one end of said slide, said second bracket movable into the path of longitudinal movement opposite the other end of said slide, and means on each of said brackets to engage the ends of said slide.

5. The device of claim 3 wherein said pin means is adapted to be moved to vary the shear strength of said pin means.

6. The device of claim 3 wherein said restraining means is adapted to restrain the longitudinal movement of the slide in one direction while permitting longitudinal movement in the other direction.

7. A suspension device for supporting a cable on a tower comprising; a shear pin, a slide having a substantially rectangular cross section, said slide adapted on one side for connection to a cable and on its other side for connection with said shear pin, a slide support having a substantially C-shaped cross section, said slide fitting within the slide support and disengageable from said slide support only by movement perpendicular to said C-shaped cross section, said slide support being adapted to allow extension of said cable attaching means on said slide through the break in said C and having means for securing said shear pin at a point on the slide support opposite the break in said C and said shear pin connecting said slide support to said slide to prevent movement of said slide in a direction perpendicular to the plane of said C-shaped cross section.

8. The device of claim 7 wherein the slide support is attached to a tower by pivotal means and the slide is attached to a cable by pivotal means, said slide support pivotal means providing rotation in a plane substantially perpendicular to the plane of rotation provided by the pivotal means attaching the slide to the cable.

9. The device of claim 7 wherein those surfaces of the slide and slide support which bear against each other are coated with polytetrafluoroethylene.

10. The device of claim 7 wherein the slide support is provided with means to restrain longitudinal movement on the slide in the support when said pin is removed.

References Cited

UNITED STATES PATENTS

| | | |
|---|---|---|
| 2,665,128 | 1/1954 | Guffey. |
| 2,931,606 | 4/1960 | Fraser et al. _____ 248—64 |
| 3,005,866 | 10/1961 | Fraser et al. _____ 174—150 X |
| 3,117,181 | 1/1964 | Wilson _____ 248—64 X |

LARAMIE E. ASKIN, Primary Examiner

U.S. Cl. X.R.

248—64